US010523615B1

(12) United States Patent
Sim et al.

(10) Patent No.: US 10,523,615 B1
(45) Date of Patent: Dec. 31, 2019

(54) METHOD THAT ALLOWS A PUBLISHER'S WEBSITE TO ALLOW REGISTERED USERS TO UPLOAD AUDIO AND VIDEO CONTENT ON THE PUBLISHER'S WEBSITE

(71) Applicants: Kiaran Sim, Los Angeles, CA (US); Jennifer Dyer, Los Angeles, CA (US)

(72) Inventors: Kiaran Sim, Los Angeles, CA (US); Jennifer Dyer, Los Angeles, CA (US)

( * ) Notice: Subject to any disclaimer, the term of this patent is extended or adjusted under 35 U.S.C. 154(b) by 42 days.

(21) Appl. No.: 16/036,937

(22) Filed: Jul. 17, 2018

(51) Int. Cl.
*H04L 12/58* (2006.01)
*G06F 9/54* (2006.01)
*G10L 15/26* (2006.01)
*H04L 29/08* (2006.01)
*G06F 16/41* (2019.01)
*G06F 16/44* (2019.01)
*G06F 16/955* (2019.01)
*G06F 16/958* (2019.01)

(52) U.S. Cl.
CPC .............. *H04L 51/16* (2013.01); *G06F 9/547* (2013.01); *G06F 16/41* (2019.01); *G06F 16/44* (2019.01); *G06F 16/955* (2019.01); *G06F 16/958* (2019.01); *G10L 15/265* (2013.01); *H04L 51/10* (2013.01); *H04L 67/02* (2013.01)

(58) Field of Classification Search
CPC ....... H04L 51/16; H04L 51/10; G06F 16/955; G06F 16/958; G06F 16/44; G06F 16/41; G06F 9/547; G10L 15/265
See application file for complete search history.

(56) References Cited

U.S. PATENT DOCUMENTS

| 8,452,710 | B2* | 5/2013 | Smith ..................... G06F 21/00 705/50 |
| 9,294,284 | B1* | 3/2016 | Mao ....................... H04L 9/3247 |
| 9,549,152 | B1* | 1/2017 | Nayyar .................. H04N 7/148 |
| 9,870,349 | B2* | 1/2018 | Wei ........................ H04L 67/10 |
| 9,882,999 | B1* | 1/2018 | Xu ........................... H04L 67/22 |
| 2013/0033971 | A1* | 2/2013 | Stier ................ H04N 21/25866 369/1 |
| 2015/0088968 | A1* | 3/2015 | Wei ........................ H04L 67/10 709/203 |
| 2015/0154385 | A1* | 6/2015 | Chastagnol ............ G06Q 30/06 726/26 |
| 2015/0193814 | A1* | 7/2015 | Eppinger ........... G06Q 30/0242 705/14.41 |
| 2015/0310523 | A1* | 10/2015 | Silvernail ............. G06Q 50/16 705/313 |
| 2015/0334339 | A1* | 11/2015 | Dejene .................... H04N 5/76 705/309 |
| 2016/0112473 | A1* | 4/2016 | Labranche ........... H04M 3/533 709/204 |
| 2017/0024100 | A1* | 1/2017 | Pieper .................. G06F 3/0486 |
| 2017/0034112 | A1* | 2/2017 | Perlegos ................ H04L 51/32 |
| 2017/0294212 | A1* | 10/2017 | Allen .................. G11B 27/031 |
| 2019/0007506 | A1* | 1/2019 | Xu .......................... H04L 67/22 |
| 2019/0158484 | A1* | 5/2019 | Grunewald ........... G06N 20/00 |
| 2019/0182554 | A1* | 6/2019 | Schupak ............... H04L 65/601 |

* cited by examiner

Primary Examiner — John A Follansbee
Assistant Examiner — Fadi Haj Said
(74) Attorney, Agent, or Firm — Ruben Alcoba, Esq.

(57) ABSTRACT

A method that allows registered users of a publisher's website to upload audio and video content on a thread of the publisher's website and wherein the uploaded content is transcribed, by a backend client comment management program for later retrieval by any user having access to the publisher's website.

7 Claims, 2 Drawing Sheets

Figure 1:
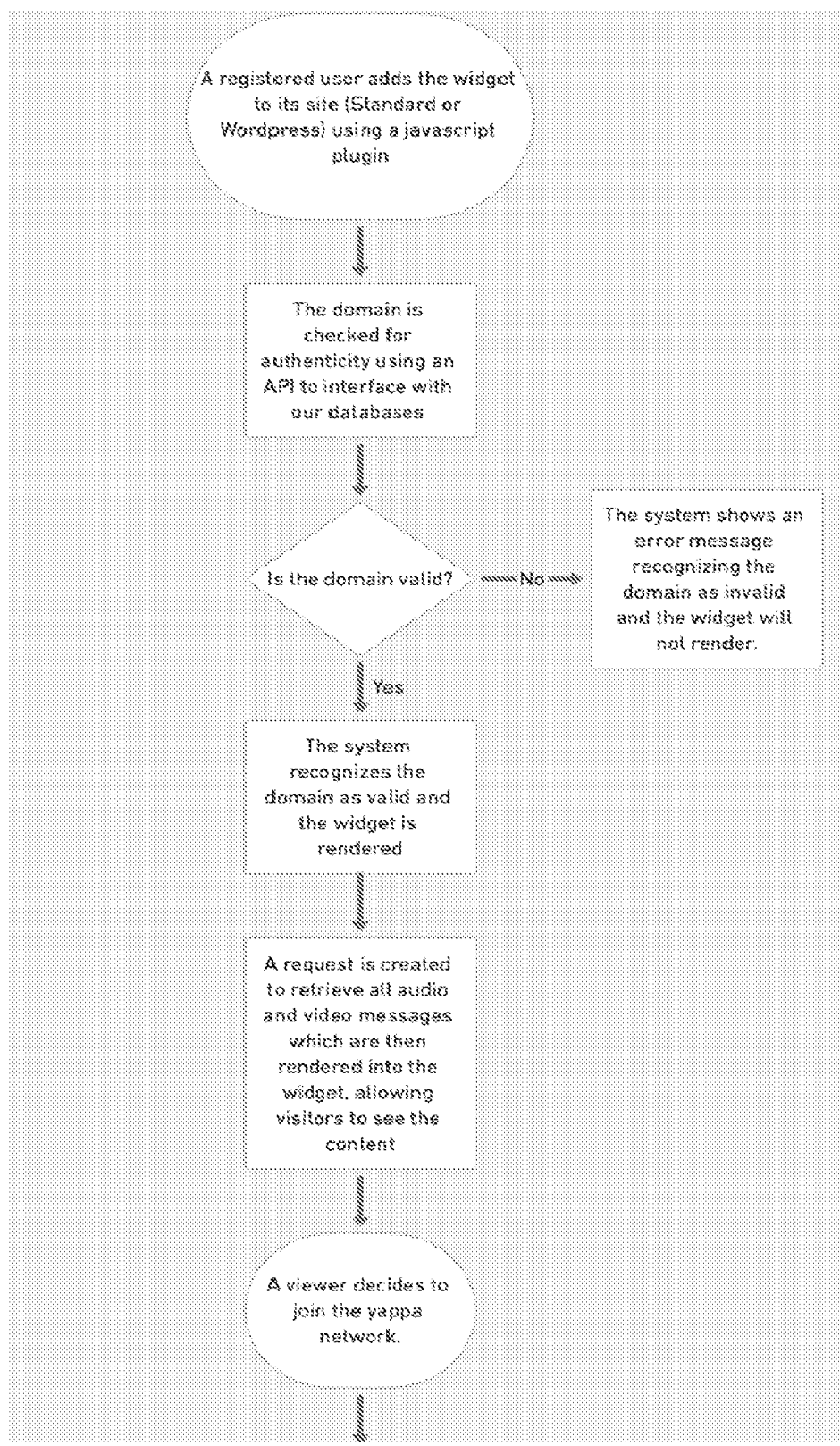

METHOD THAT ALLOWS A PUBLISHER'S WEBSITE TO ALLOW REGISTERED USERS TO UPLOAD AUDIO AND VIDEO CONTENT ON THE PUBLISHER'S WEBSITE

BACKGROUND

The present invention is directed to a method that allows a publisher's website to allow registered users to upload audio and video content on a thread of the publisher's website.

The present invention uses a widget that is uploaded on a publisher's website that will allow registered users of the website to upload audio and video content as threads posted on the publisher's website.

The publisher's website will be connected to a specific API that will use a back end client comment management program to transcribe the audio or video content into text and the text is then indexed by a set of key words, a trending topic, and/or a category.

The owner of the publisher's website will then be able to analyze and categorize the uploaded audio and video content and the interactions between registered users uploading audio and video content on the publisher's website.

Before the present invention, users of a publisher's website were able to post text on publisher's website, yet were not given a tool that would allow them to post audio or video content on a thread of the publisher's website that would be transcribed for later retrieval by any user having access to the publisher's website.

The present invention will allow users of the Publisher's website to build their own communities within the publisher's website wherein the communities can directly communicate to each other via audio or video comments that are stored on third party websites. The invention will also allow the owners and users of the publisher's website, via the transcription tool of the website, to flag comments that are inappropriate or offensive to anyone using the publisher's website. The transcription aspect of the website also allows the owner's of the website to embed the content posted on the publisher's website based on the content that was posted.

The inventor defines a Yappa Comment as a verbally spoken statement that expresses an opinion about someone or something. A verbally spoken note that explains or discusses the meaning of something. To 'Yap' means to talk, discuss, remark, observe, make a statement, utterance, pronouncement, judgement, reflection, opinion, view, criticize, debate, speak, talk, and discuss verbally, via the Yappa commenting widget.

For the foregoing reason there is a need for a method that will allow a publisher's website to allow registered users to upload audio and video content on a thread of the publisher's website and wherein the uploaded content would be transcribed for later retrieval by any user having access to the publisher's website.

SUMMARY

The present invention is directed to a method that allows registered users of a publisher's website to upload audio and video content on a thread of the publisher's website and wherein the uploaded content is transcribed, by a back end client comment management program for later retrieval by any user having access to the publisher's website.

The present invention requires a publisher's website, a specific application program interface, hereinafter a "Specific API", and a widget that allows a registered user to upload audio and video content, to comment on any of the uploaded audio or video content, and to flag any of the uploaded audio or video content.

The method of allowing a publisher's website to allow registered users to upload audio and video content on the publisher's website, comprising: providing a publisher's website; providing a specific API; installing a widget having a JAVASCRIPT plugin that is associated with the specific API on the publisher website, the widget will allow a user to upload audio or video content on the publisher's website; having the publisher's website call the specific API to validate the publisher's domain as an authorized publisher's website; if the publisher's website domain is validated, then the API returning the widget rendered served in a static server and targeted to an iframe set by the plugin within the publisher's website; loading the widget on the publisher's website, then having the API request the retrieval of all audio or video content; next, displaying all audio or video on the publisher's website; and then allowing users of the publisher's website to view audio or video content on the publisher's website.

The method will allow users of the publisher's website to register with the API, and after registering with the API, the users shall be deemed registered users. Register users of the publisher's website will be allowed upload audio or video content on to the publisher's website, to comment on the publisher's website, or to flag audio or video content on the publisher's website.

The method will use a backend client comment management program to transcribe the uploaded audio or video content into text. The text shall then be used to tag the audio or video content via keywords, topics, categories, or trends on the publisher's website and/or on the application program interface.

The present invention works by installing the widget of the Specific API via a plugin into the publisher's website. Once the widget is installed it prompts a call to the Specific API, Yappa's API, to validate if the publisher's website domain (in which the widget has been set) is authorized. If so, the API will return the widget rendered served in a static server and targeted to an iframe set by the plugin within the Publisher's website. Once the widget has been loaded, the API will make a request to retrieve all the uploaded content (hereinafter uploaded content may be referred as "Yaps") to be shown publicly.

About the visibility of the Yaps. Any anonymous user can browse all the Yaps listed. But only the registered, logged and valid users (because users can be banned) will be able to publish a new Yap, leave a reply, add a flag or even vote on other Yaps. The Specific API (hereinafter the Specific API may be referred as "Yappa") uses Passport to register the users based upon their profiles in the most known social media platforms.

The uploading of content. There are three possible formats to upload a "Yap": recording audio, recording video or uploading a video/audio file. All onsite recordings are performed with RecordRTC (based on WebRTC) and immediately encoded (base64). All files uploaded offline will be sent as multipart requests. Lastly all the files are cached and distributed through Amazon Cloudfront to enhance the performance.

The inventor of the present invention believes that audio and video posting of comments on threads of a publisher's website is the way of the future when reviewing content on the publisher's website. The transcription of the audio or video content into text that can be embedded into the audio or video content for later retrieval is the key to the present invention, for it will allow registered users of the publisher's website to post social specific audio comments and messages related to a specific item or topic on a thread or website that will later be able to be categorized and embedded into other social media websites.

The present environment of social media has made it very popular to post videos of one's self on other's platforms. The present invention will now allow the posting of videos or audible files on publisher's websites that will be connected to specific items, concerns, or products on the publisher's website. The publisher's website then will use a backend tool to transcribe the audio content of the audio and video content into text so that the information posted by the registered users can later be used across many platforms by the owner of the publisher's website.

A program used to practice the method of present invention shall transcribe audible words from the UGC (User Generated Content) to deliver analytical data. The program that is used to practice the method of the present invention transcribes audible comments into text using a back-end Client Comment Management Program (CCMP). The text transcribed is indexed by key words, trending topics, and categories, allowing for audible comments and conversations to be searchable. This further allows the program used to practice the method of the present invention to deliver key and critical analytical data to clients regarding the audible comments, and interactions posted by their users, on their platforms.

An object of the present invention is to allow a publisher's website to allow registered users to post audio or video comments that will be transcribed into text for later retrieval.

Another object of the present invention is to allow a publisher's website to serve as an open forum audio and video conversational tool.

Yet another object of the present invention is to allow a publisher's website to transcribe audible words from the user generated audio or video content to deliver analytical data.

Still another object of the present invention is to allow a publisher's website to nest audio and video communication posted on the publisher's website.

Yet still another object of the present invention is to provide a Yappa Podcast mode. By changing the feature mode of the present invention, Yappa becomes a fully functional Podcast tool, which allows publishers to record or upload audio/video podcasts up to 2 hours in length. This gives users the ability to comment on any podcast within the same environment. Yappa Podcast feature is a new way to streamline traditional podcasts for the individual publishers by consolidating them within a single widget, thus also freeing up the pixel space on their website real estate. The Podcast mode can be implemented into radio, TV, blogs, and websites.

Figure 2:
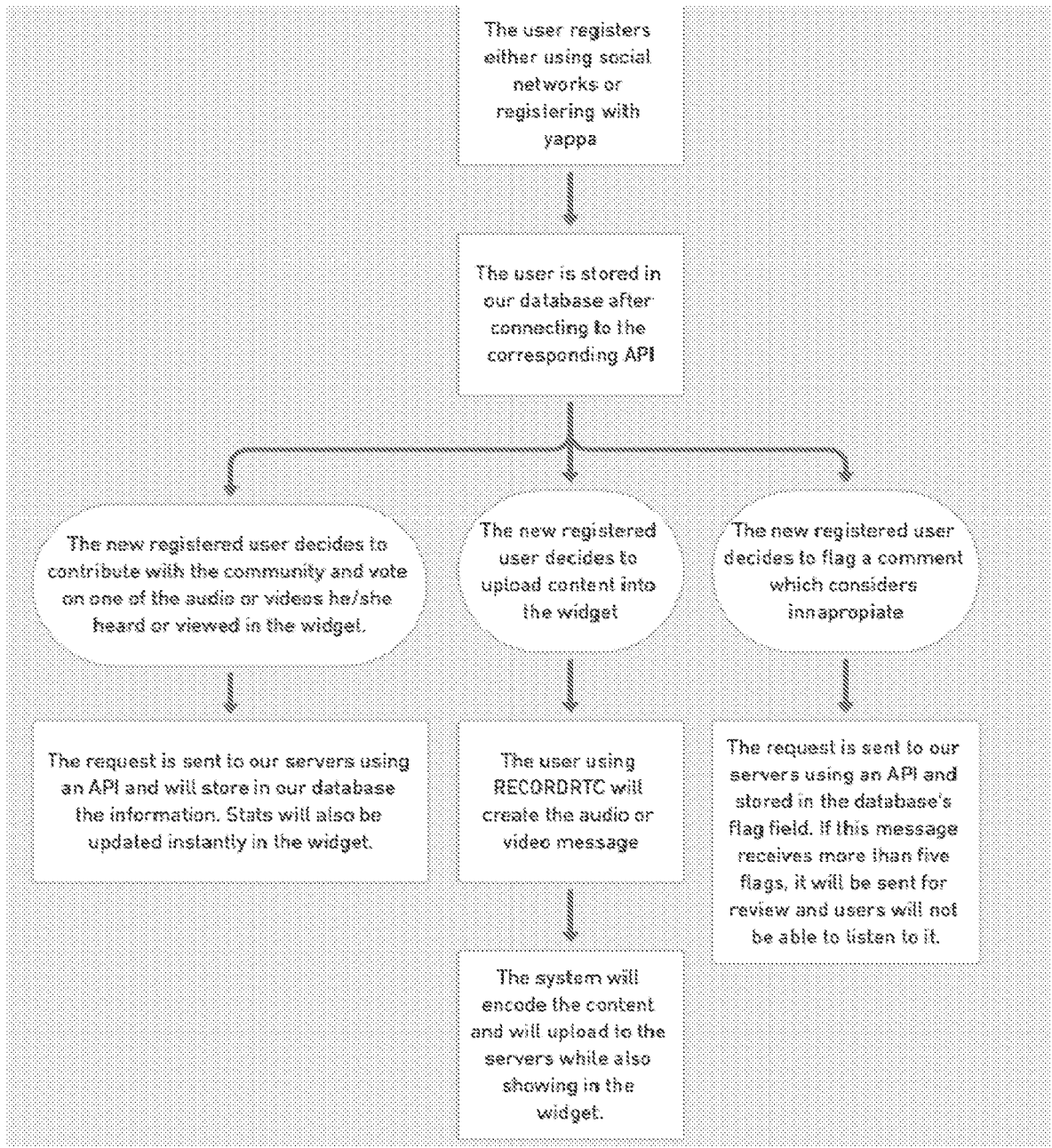

These and other features, aspects, and advantages of the present invention will become better understood with regards to the following description, appended claims, and drawings where:

FIG. 1 is a top first part of a diagram that shows how a user would use the present invention; and FIG. 2 is a bottom of the diagram that shows how the user would use the present invention.

DESCRIPTION

The present invention is a method of allowing a publisher website to allow registered users to upload audio and video content on the publisher website, comprising: providing a publisher website; Providing a specific API; installing a widget having a JAVASCRIPT plugin that is associated with the specific API on the publisher website, the widget will allow a user to upload audio or video content on the publisher website; having the publisher website call the specific API to validate the publisher's domain as an authorized publisher website; if the publisher's domain is validated, then the API returning the widget rendered served in a static server and targeted to an iframe set by the plugin within the publisher's website; loading the widget on the publisher's website, then having the API request the retrieval of all audio or video content; next, displaying all audio or video on the publisher website; and then allowing users of the publisher website to view audio or video content on the publisher website.

The present invention can comprise of a allowing a user of the publisher website to register with the API, after registering with the API, the user shall be a registered user, and allowing the register user of the publisher website to upload audio or video content on to the publisher website, or to flag audio or video content on the publisher website.

The present invention can further comprise of allowing the user to vote on the desirability of any audio or video content posted by another user to help determine the relevance of the audio or video content.

The present invention can still further comprise of having the API register the registered users based on each registered user's profile as described in other social media platforms.

The step of uploading of audio or video content is performed using RECORDRTC and then the audio or video is immediately encoded.

The present invention can yet still further comprise of catching and distributing all uploaded registered user audio and video content via a content delivery network.

The present invention can also further comprise of having the API transcribe the user audio and video content into a text and having the API index the text as at least one keyword that can be searched.

In embodiments of the present invention, the audio or video content, after being transcribed to text, will provide the publisher website with registered user analytical data.

The present invention can yet also still further comprise of chronologically nesting all audio or video content posted on a publisher website thread.

The present invention can yet further comprise of allowing the publisher website to upload audio or video content on a thread to simulate a podcast.

The API, of some embodiments of the present invention, uses a backend client comment management program to transcribe the audio or video content into text and the text is then indexed by a set of key words, a trending topic, and/or a category.

An advantage of the present invention is that it allows a publisher's website, to allow registered users, to post audio or video comments that are transcribed into text for later retrieval.

Another advantage of the present invention is that it allows a publisher's website to serve as an open forum audio and video conversational tool.

Yet another advantage of the present invention is that it allows a publisher's website to transcribe audible words from the user generated audio or video content to deliver analytical data.

Still another advantage of the present invention is that it allows a publisher's website to nest audio and video communication posted on the publisher's website.

Yet still another advantage of the present invention is that it provides a Yappa Podcast mode. By changing the feature mode of the present invention, Yappa becomes a fully functional Podcast tool, which allows publishers to record or upload audio/video podcasts up to 2 hours in length. This gives users the ability to comment on any podcast within the same environment. Yappa Podcast feature is a new way to streamline traditional podcasts for the individual publishers by consolidating them within a single widget, thus also freeing up the pixel space on their website real estate. The Podcast mode can be implemented into radio, TV, blogs, and websites.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. A method of allowing a publisher website to allow registered users to upload audio and video content on the publisher website comprising:
   providing the publisher website;
   providing a specific application product interface (hereinafter "API");
   installing a widget having a JAVASCRIPT plugin that is associated with the specific API on the publisher website, the widget will allow a user to upload audio or video content on the publisher website;
   having the publisher website call the specific API to validate the publisher's domain as an authorized publisher website;
   if the publisher's domain is validated, then the API returning the widget rendered served in a static server and targeted to an iframe set by the plugin within the publisher's website;
   loading the widget on the publisher's website, then having the API request the retrieval of all audio or video content;
   next, displaying all audio or video on the publisher website;
   then allowing users of the publisher website to view audio or video content on the publisher website;
   allowing a user of the publisher website to register with the API, after registering with the API, the user shall be a registered user;
   allowing the register user of the publisher website to upload audio or video content on to the publisher website, or to flag audio or video content on the publisher website;
   allowing the user to vote on the desirability of any audio or video content posted by another user to help determine the relevance of the audio or video content; and
   having the API register the registered users based on each registered user's profile as described in other social media platforms, wherein the uploading of audio or video content is performed using RECORDRTC and then immediately encoding the audio or video.

2. The method of allowing a publisher website to registered allow users to upload audio and video content on the publisher website of claim 1, comprising catching and distributing all uploaded registered user audio and video content via a content delivery network.

3. The method of allowing a publisher website to allow registered users to upload audio and video content on the publisher website of claim 2, comprising:
   having the API transcribe the user audio and video content into a text; and
   having the API index the text as at least one keyword that can be searched.

4. The method of allowing a publisher website to allow registered users to upload audio and video content on the publisher website of claim 3, wherein the audio or video content, after being transcribed to text, will provide the publisher website with registered user analytical data.

5. The method of allowing a publisher website to allow users to upload audio and video content on the publisher website of claim 4, comprising chronologically nesting all audio or video content posted on a publisher website thread.

6. The method of allowing a publisher website to allow registered users to upload audio and video content on the publisher website of claim 5, comprising allowing the publisher website to upload audio or video content on a thread to simulate a podcast.

7. The method of allowing a publisher website to allow registered users to upload audio and video content on the publisher website of claim 2, wherein the API uses a backend client comment management program to transcribe the audio or video content into text and the text is then indexed by a set of key words, a trending topic, and/or a category.

* * * * *